United States Patent
Vijayaraghavan et al.

(10) Patent No.: US 9,214,860 B2
(45) Date of Patent: Dec. 15, 2015

(54) COMPARATOR MULTIPLEXING LDO AND CONVERTED OUTPUT TO DC-DC CONVERTER CIRCUITRY

(75) Inventors: Ravi Vijayaraghavan, Chennai (IN); Sudhir Polarouthu, Hyderabad (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 449 days.

(21) Appl. No.: 12/790,555

(22) Filed: May 28, 2010

(65) Prior Publication Data

US 2011/0291637 A1  Dec. 1, 2011

(51) Int. Cl.
G05F 1/00 (2006.01)
H02M 3/155 (2006.01)
H02M 3/158 (2006.01)
H02M 1/00 (2007.01)

(52) U.S. Cl.
CPC .............. H02M 3/155 (2013.01); H02M 3/158 (2013.01); *H02M 2001/0006* (2013.01); *H02M 2001/0045* (2013.01)

(58) Field of Classification Search
CPC ............. G05F 1/46; G05F 1/56; G05F 1/562; G05F 1/565; G05F 1/575; H02M 3/156–3/158; H02M 3/1584; H02M 2003/1586
USPC ......... 323/269, 234, 237, 265, 268, 273–275, 323/282–285
See application file for complete search history.

(56) References Cited

U.S. PATENT DOCUMENTS

| | | | | |
|---|---|---|---|---|
| 6,127,814 A * | 10/2000 | Goder | | 323/282 |
| 7,474,879 B2 * | 1/2009 | Turner et al. | | 455/127.1 |
| 7,750,584 B1 * | 7/2010 | Li et al. | | 318/108 |
| 2005/0052204 A1 * | 3/2005 | Chun | | 326/108 |
| 2005/0189931 A1 * | 9/2005 | Ishino | | 323/282 |
| 2006/0279264 A1 * | 12/2006 | Niculae et al. | | 323/274 |
| 2006/0290336 A1 * | 12/2006 | Bazes | | 323/312 |
| 2007/0029975 A1 * | 2/2007 | Martin et al. | | 320/134 |
| 2008/0061757 A1 * | 3/2008 | Khayat et al. | | 323/283 |
| 2008/0203983 A1 * | 8/2008 | Lo Iacono et al. | | 323/266 |
| 2009/0167279 A1 * | 7/2009 | Wei et al. | | 323/304 |
| 2010/0074030 A1 * | 3/2010 | Passerini et al. | | 365/189.02 |

* cited by examiner

*Primary Examiner* — Jeffrey Gblende
(74) *Attorney, Agent, or Firm* — Lawrence J. Bassuk; Frank D. Cimino

(57) ABSTRACT

A DC-DC converter receives input power from a power source and generates a regulated DC voltage as an output. The DC-DC converter contains multiple blocks, each of which is powered by a power supply received on a supply terminal. The DC-DC converter also contains a voltage regulator to generate a lower voltage from the power source. The lower voltage generated by the regulator is provided as the power supply on the supply terminal when the regulated DC voltage is less than a reference value, and the regulated DC voltage itself is provided as the power supply on the supply terminal otherwise. The regulator is switched off when the blocks are powered by the regulated DC voltage, thereby leading to increased efficiency of the DC-DC converter.

3 Claims, 3 Drawing Sheets

COMPARATOR MULTIPLEXING LDO AND CONVERTED OUTPUT TO DC-DC CONVERTER CIRCUITRY

BACKGROUND OF THE INVENTION

1. Technical Field

Embodiments of the present disclosure relate generally to power supply circuits, and more specifically to increasing efficiency of DC-DC converters.

2. Related Art

A DC-DC converter is a circuit that generates a regulated direct current (DC) output voltage from a DC input voltage. A regulated output voltage generally refers to a constant-value output voltage despite changes in the value of the current drawn (within a range) from the converter. The DC input voltage and the regulated DC output voltage generally have different voltage levels. The regulated DC output voltage of a DC-DC converter may be used as a power supply for powering electronic circuits.

Efficiency of a DC-DC converter is generally the ratio of the total output power delivered to a load (or loads) powered by the output of the DC-DC converter and the total power consumed by the DC-DC converter in delivering the output power, and may be specified, for example, as a percentage. It is generally desirable that the efficiency of a DC-DC converter be high.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A DC-DC converter receives input power from a power source and generates a regulated DC voltage as an output. The DC-DC converter contains multiple blocks, each of which is powered by a power supply received on a supply terminal. The DC-DC converter also contains a voltage regulator to generate a lower voltage from the power source. The lower voltage generated by the regulator is provided as the power supply on the supply terminal when the regulated DC voltage is less than a reference value, and the regulated DC voltage itself is provided as the power supply on the supply terminal otherwise.

Several aspects of the disclosure are described below with reference to examples for illustration. It should be understood that numerous specific details, relationships, and methods are set forth to provide a full understanding of the disclosure. One skilled in the relevant art, however, will readily recognize that embodiments can be practiced without one or more of the specific details, or with other methods, etc. In other instances, well-known structures or operations are not shown in detail to avoid obscuring the features of the disclosure.

BRIEF DESCRIPTION OF THE VIEWS OF DRAWINGS

Example embodiments of the present disclosure will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Environment

Figure 1:
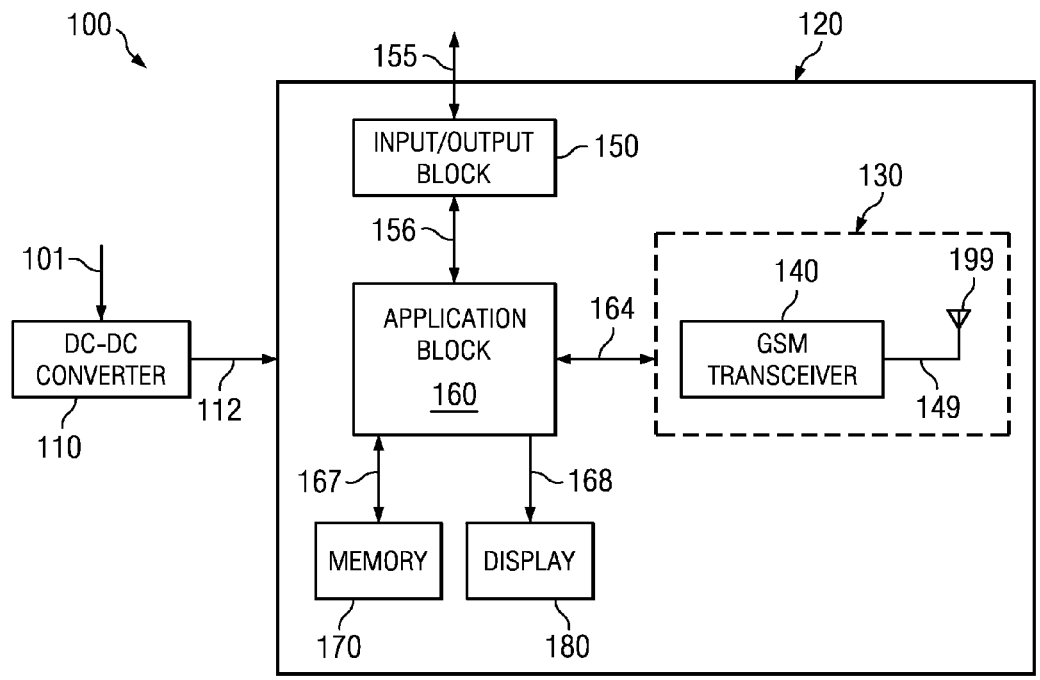
FIG. 1 is a block diagram of an example device in which several embodiments of the present disclosure can be implemented.

FIG. 1 is a block diagram of an example device in which several embodiments of the present disclosure can be implemented. The diagram shows mobile phone 100, which is in turn shown containing DC-DC converter 110 and communication block 120. Communication block 120 is shown containing GSM (Global System for Mobile Communication) block 130, application block 160, memory 170, display 180 and input/output (I/O) block 150. The components/blocks of mobile phone 100 in FIG. 1 are shown merely by way of illustration. However, mobile phone 100 may contain more or fewer components/blocks, and may be implemented according to other technologies as well. For example, mobile phone 100 may be implemented according to code division multiple access (CDMA) technology instead of GSM technology. Further, while in the examples below, techniques for reducing power consumption in dc-dc converters are described with respect to mobile phones, the techniques can be applied in the context of dc-dc converters used in other environments as well.

The blocks of FIG. 1 may be implemented either as separate integrated circuits (IC), or all implemented within a same IC. Typically, antenna 199 (as well as one or more of components such as filters assumed to be contained within block 130) of FIG. 1 may be mounted on a printed circuit board (PCB), with corresponding PCB trace(s) providing the electrical connectivity represented by path 14.

DC-DC converter 110 operates to generate a regulated DC voltage on path 112 using (unregulated) DC voltage received from a power source such as a battery on path 101. The regulated DC voltage on path 112 may be used to supply power for the operation of the components/blocks of communication block 120. The DC voltage level on path 101 is generally different from the DC voltage level on path 112. DC-DC converter 110 may be implemented as a linear-mode converter or switch-mode (switching) converter. As is well known in the relevant arts, linear-mode DC-DC converters generally control the resistance of a transistor operated in the linear region to generate a desired output DC voltage from an input DC voltage. Switch-mode converters employ transistors operated to be switched ON and OFF to generate the desired output DC voltage from the input DC voltage, and typically use filters (using inductors and capacitors, for example) to obtain a constant value DC voltage from a pulsed/switching output voltage. Further switch-mode DC-DC converters may be of types buck (output voltage lesser than input voltage) or boost (output voltage greater than input voltage). In an embodiment, DC-DC converter 110 is implemented as buck-type switch-mode converter. However, in other embodiments, DC-DC converter 110 may be implemented as other types of converters, noted above.

Communication block 120 receives the regulated DC voltage on path 112. The regulated DC voltage is used to operate the blocks/components of communication block 120 described below.

GSM block 130 is shown containing GSM transceiver 140 and transmit antenna 199. GSM block 130 may contain respective receive antenna and filters as well, but are not shown in FIG. 1. GSM block 130 operates to provide wireless telephone operations, with GSM transceiver 110 containing receiver and transmitter sections to perform the corresponding receive and transmit functions.

Input/output (I/O) block 150 provides a user with the facility to provide inputs via path 155, for example, to dial numbers. In addition, I/O block 150 may provide outputs received from application block 160 also on path 155. Such outputs may include data, voice, images etc. I/O block 150 communicates with application block 160 via path 156.

Application block 160 may contain corresponding hardware circuitry (e.g., processors), and operates to provide various user applications provided by mobile phone 100. The user applications may include voice call operations, data transfers, providing positioning information, etc. Application block 160 may operate in conjunction with I/O block 150 to provide such features.

Display 180 displays image frames in response to the corresponding display signals received from application block 160 on path 168. The images may be generated by a camera provided in mobile phone 100, but not shown in FIG. 1. Display 180 may contain memory (frame buffer) internally for temporary storage of pixel values for image refresh purposes, and may be implemented, for example, as a liquid crystal display screen with associated control circuits.

Memory 170 stores program (instructions) and/or data (provided via path 167) used by applications block 160, and may be implemented as RAM, ROM, flash, etc, and thus contains volatile as well as non-volatile storage elements, and represents a computer (or a machine) readable medium.

Some of the features of DC-DC converter 110 will be clearer in comparison with a prior implementation, and accordingly the prior implementation is described first.

2. Prior DC-DC Converter

Figure 2:
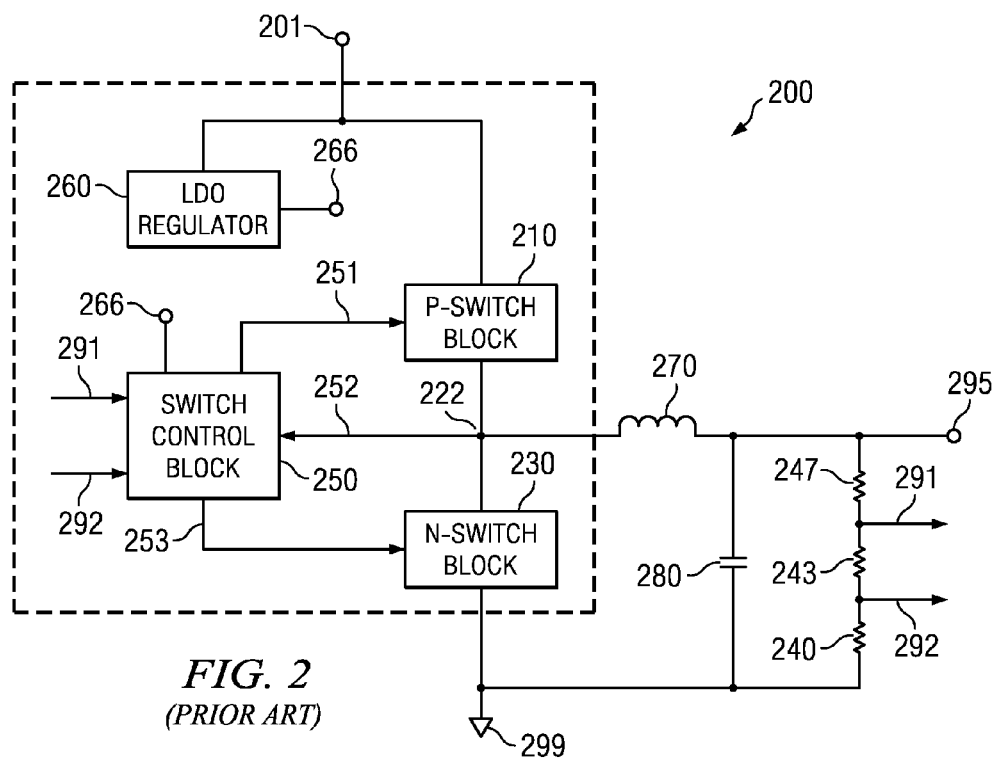
FIG. 2 is a block diagram of a prior DC-DC converter.

FIG. 2 is a block diagram of a DC-DC converter in a prior embodiment. DC-DC converter 200 is shown containing P-switch block 210, N-switch block 23, switch control block 250, low drop-out (LDO) regulator 260, inductor 270, capacitor 280 and resistors 247, 243 and 240. P-switch block 210, N-switch block 23, switch control block 250, and low drop-out regulator (LDO) 260 may be implemented in integrated circuit (IC) form, while inductor 270, capacitor 280 and resistors 247, 243 and 240 may be in discrete form external to such an IC. Alternatively, all of the components and blocks of DC-DC converter 200 may be implemented on a same IC.

DC-DC converter receives power from an unregulated power supply (typically a battery, in deployment environments/devices such as that of mobile phone 100 of FIG. 1) on path 201. Terminal 299 represents a ground terminal. The regulated output voltage of DC-DC converter 200 is provided at output 295.

P-switch block 210 is connected between supply terminal 211 and node 222. N-switch block 230 is connected between node 222 and ground 299. P-switch block 210 and N-switch block 230 are each operated to be switched ON and OFF by pulse-width modulated (PWM) or pulse-frequency modulated (PFM) signals generated by switch control block 250. Switch control block 250 includes circuitry and logic that control (via respective paths 251 and 253) ON/OFF states of blocks 210 and 230 to provide a desired value of DC voltage on node 295.

Switch control block 250 receives voltages (via paths 291 and 292) indicative of the output voltage (on output node 295) to adjust the pulse-width or pulse frequency of signals 251 and 253 to provide (and maintain) the output 295 at the desired voltage level. Switch control block 250 may also operate to limit the current drawn from output 295 (termed output current-limiting) by adjusting the pulse width or frequency of signals 251 and 253 based also on the voltage at node 222 (indicated as being provided to switch control block 250 on path 252).

Inductor 270 is connected between node 222 and output node 295. Capacitor 280 is connected between output 295 and ground 299. Inductor 270 and capacitor 280 operate to filter the switching waveform (that would otherwise be generated at node 222 due to operation of blocks 210 and 230), to provide a constant-value voltage at output 295.

LDO 260 receives DC input voltage from a DC source (e.g., a battery) on path 201. LDO 260 converts the voltage level on path 201 to a lower regulated voltage level typically required for reliable operation of one or more components/blocks of DC-DC converter 200. For example, switch control block 150 may be designed to be operated with voltage 266 as the supply voltage, as shown in FIG. 2. Lower power supply voltage level 266 may be necessary for reliable operation of switch control block 150 (as well as one or more of other blocks, not shown in FIG. 2) due, for example, to implementation of the block(s) using low-voltage and/or small geometry technologies (e.g., such as Ultra Deep Sub-Micron technology), and hence the corresponding lower values of breakdown voltage for transistors used in the blocks. Example values for supply voltages 201 and 266 are 3.6V and 1.8V respectively.

The efficiency of DC-DC converter 200 may vary with the load current drawn by a load connected to output node 295. In particular, the efficiency may be poor (low) for low values of load currents, as for example, when communication block 120 of mobile phone 100 is in a standby/sleep mode. In such modes, the current drawn from DC-DC converter 200 may be very low (e.g., in the range 50 micro Amperes (μA)) to 10 milli Amperes (mA)), and the operating current drawn by LDO 260 of DC-DC converter 200 may have values that are significant compared with the load current (current drawn from output 295), thereby reducing the efficiency of DC-DC converter 200, as well as reducing the battery-life of the battery supplying the power supply current drawn from supply 201 (when a battery is used as power supply 201). As an example illustration, operational current drawn by LDO 260 may have a value of 50 μA contributing to a power consumption of 180 micro Watts (μW), which may be a substantial percentage of the total power delivered, especially at low load currents, and therefore be unacceptable.

It is noted that components in blocks such as switch control block 250 of DC-DC converter 200 may be implemented to have enhanced reliability to enable operation directly from higher voltages, even when implemented according to low-voltage technologies such as UDSM (Ultra-Deep Sub-Micron). In such implementations, blocks such as switch control block 250 may be directly powered by the higher voltage supply 201 (e.g., 3.6V) without compromising reliability of their internal components, and LDO 260 (and the corresponding power loss in LDO 260) may be eliminated. However, implementation for enhanced reliability may require modifications and for additions to the fabrication process (e.g., design of additional masks to be used to provide the enhanced reliability), and hence may be unacceptable due to the additional cost and complexity involved.

3. Improving the Efficiency of a DC-DC Converter

Figure 3:
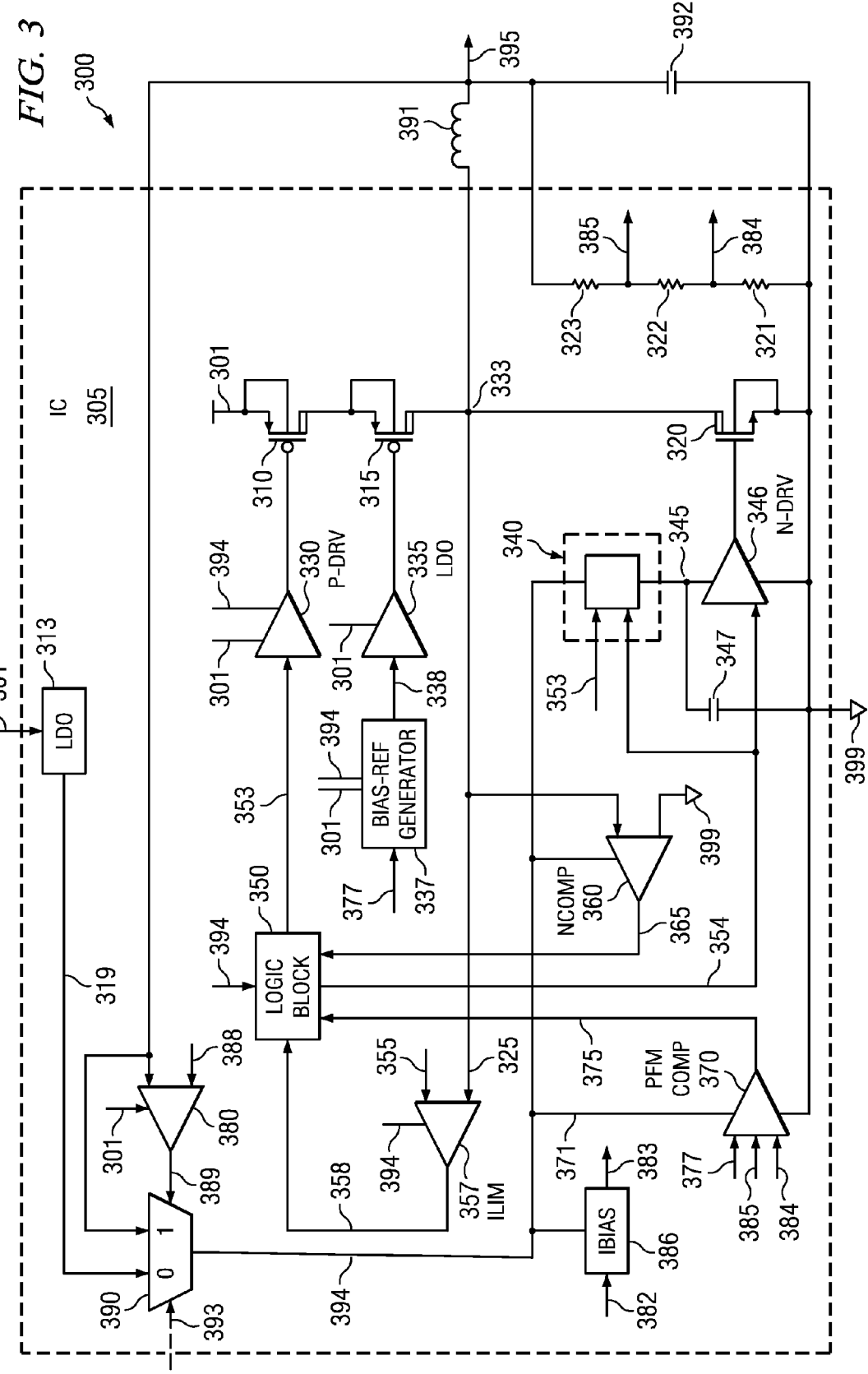
FIG. 3 is a diagram of a DC-DC converter in an embodiment.

FIG. 3 is a block diagram of a DC-DC converter in an embodiment. DC-DC converter 300, which may be implemented in place of DC-DC converter 110 of FIG. 1, is shown containing PMOS transistors 310 and 315, PMOS driver (P-DRV) 330, low dropout regulators (LDO) 335 and 313, NMOS transistor 320, NMOS driver (N-DRV) 346, multiplexer 390, current limit comparator (ILIM) 357, PFM comparator 370, comparators 360 and 380, logic block 350, bias current generator (IBIAS) 386, bias reference generator 337, resistors 321, 322 and 323, resistance block 340, capacitors 347 and 392, and inductor 391. In an embodiment, components/blocks 310, 315, 330, 335, 313, 320, 346, 390, 357, 360, 370, 380, 350, 386, 337, 340, 347 and resistors 321, 322, and 323 are implemented as an IC (denoted as IC 305 in FIG. 3), while capacitor 392 and inductor 391 are implemented as discrete components provided outside of the IC. Alternatively, all of the components and blocks of DC-DC converter 300 may be implemented on a same IC. Transistors 310, 315 and 320 may be implemented as power MOSFETS, and may further be designed as drain-enhanced MOSFETS. Further, while the description below is provided with respect to a switched-mode buck DC-DC converter, the techniques may be applied in other types of DC-DC converters as well. Also, the specific voltages and signal levels noted in the embodiments below are provided by way of example. However, other voltages and signal levels may be used, with suitable modifications or differences in the circuits, to suit other environments or requirements.

Terminal 301 receives a DC power supply, for example, from a battery. Terminal 399 represents ground. The output regulated DC voltage of DC-DC converter 300 is provided at node 395 (also referred to as output power supply 395). In the embodiment described below, it is assumed that power supply 301 is 3.6V. In an embodiment, the blocks within IC 300 are implemented using Ultra-Deep Sub Micron (UDSM) technology, and at least some of the blocks may require to be powered by a low-voltage power supply to ensure reliability of components in the blocks. Assuming supply 301 is a higher voltage than the voltage usable by the blocks, generation of a lower voltage power supply from supply 301 may be necessary. LDO 313 (voltage regulator) receives power supply 301 and generates such a low voltage power supply on path 319. In an embodiment, supply 319 equals 1.8V.

PMOS transistor 310 and NMOS transistor 320 represent the switching elements or DC-DC converter 300, and are each operated to be switched ON and OFF by corresponding control signals generated by logic block 350 and respectively buffered by P-DRV 330 and N-DRV 346 and applied to the gate terminals of the respective transistors. P-DRV 330 and N-DRV 346 represent buffers that respectively receive control signals 353 and 354, and provide corresponding buffered outputs to the gate terminals of transistors 310 and 320. In an embodiment, logic high level of the binary output of P-DRV 330 is 3.6V, and logic low level is 1.8V. The logic high level and logic low level of the binary output of N-DRV 346 are 1.8V and 0V respectively.

PMOS transistor 315 is connected in series between transistors 310 and 320 to enable PMOS transistor 310 to be switched ON and OFF using logic levels 1.8V and 3.6V respectively. It is noted that the maximum safe gate-to-source voltage (Vgs) that transistor 310 can be subjected to may be limited to 1.8V due to implementation using low-voltage technologies in UDSM CMOS processes. PMOS transistor 315 receives a 1.8V (voltage on supply 301 minus 1.8V) bias voltage from LDO 335. LDO 335, which operates as a buffer, receives a 1.8V (voltage on supply 301 minus 1.8V) reference voltage on path 338 from bias reference generator 337, and power supply from terminal 301. Bias reference generator, in turn, receives a 0.6V reference voltage on path 377, a power supply on path 394 and generates a 1.8V reference on path 338.

Logic block 350 receives power supply on path 394, and inputs from comparator 357 on path 358, comparator 370 on path 375 and comparator 360 on path 365. Logic block 350 controls the characteristics (pulse width or frequency) of pulse-type control signals provided on paths 353 and 354, based on inputs 358, 375 and 365, to cause generation of a desired output voltage on node 395. Logic block 350 may contain an oscillator internally from which control signals 353 and 354 may be derived. Logic block 350 may also operate to ensure that ON times of transistors 310 and 320 do not overlap.

Voltages 385 and 384 are derived from output power supply voltage 395 (which equals 1.8V in an embodiment), and respectively represent an upper comparison level VREF_HI and a lower comparison level VREF_LO. VREF_HI and VREF_LO are obtained by resistive voltage divider network containing resistors 323, 322 and 321. PFM comparator 370 compares voltages VREF_HI and VREF_LO with reference voltage 377 to generate output signal 375 indicative of changes required in the frequency or pulse widths of control signals 353 and 354 required to provide (or maintain) output voltage 395 at the desired voltage level. The comparison operation performed by PFM comparator 370 may include hysteresis.

ILIM 357 receives a voltage on path 325 (indicative of the current passing through inductor 391), and compares voltage 325 with a reference value provided on path 355. A value of voltage 325 higher than reference voltage 355 indicates that the current through inductor 391 is above greater than an upper limit. Based on the comparison, ILIM 357 generates output signal 358 to indicate additional (in addition to that indicated by signal 375) changes required in the frequency or pulse widths of control signals 353 and 354 to provide current limiting of the output current through inductor 391.

IBIAS 386 receives as input a reference current on path 382, and generates a bias current as output on path 383. Bias current 383 may be used for biasing components in the blocks of DC-DC converter 300. Comparator 360 is a zero-detect comparator used to prevent current through inductor 391 from going negative (i.e., into node 333), which in turn helps in reducing losses and thereby increase efficiency.

Inductor 391 connected between node 333 and output node 395, and capacitor 392 connected between output node 395 and ground 399 operate to filter the switching waveform that would otherwise be generated at node 333 due to operation of transistors 310 and 320, and enable provision of a constant-value DC voltage on output node 395.

P-DRV 330 receives power supplies 301 and 394 for operation. Supply 394 is used to power level shifters internal to P-DRV 330, to enable level-conversion of input signal 353 (which may be designed to have a logic-level swing between 0V and 1.2V) to a signal with logic-level swing between 1.8V (logic low) and 3.6V (logic high). Such level-shifting (or range modification) of signal 353 may be required to prevent transistor 310 from being subjected to undue voltage stress. N-DRV 346, ILIM 357, comparator 360, PFM comparator 370, IBIAS 386 and bias reference generator 337 receive a power supply voltage on path 394. Bias reference generator 337 additionally receives power supply 301 to enable generation of 1.8V (voltage on supply 301 minus 1.8V) reference voltage on path 338. Multiplexer 390 provides as power supply 394 one of power supply 319 and output power supply 395, based on the value on select line 389 provided by comparator 380. Multiplexer 390 is implemented as an analog multiplexer, and may use analog switches internally. Power supply 394 to N-DRV 346 is provided through resistance block 340. The requirement for provision of resistance block 340 and capacitor 347 is described below with reference to FIG. 4.

Comparator 380 compares output power supply 395 with a reference voltage on path 388. The value of reference voltage 388 equals the desired value of power supply 394, and is 1.8V in an embodiment. Comparator 380 provides as output on path 389 the comparison result (logic low or logic high) of voltages 388 and 395. Although shown as being contained within DC-DC converter 300 in FIG. 3, in an alternative embodiment comparator 380 is not implemented and multiplexer 390 instead receives a select signal from a device/component external to DC-DC converter 300, on path 393 (shown in FIG. 3 as a dotted arrow). In an embodiment, the 'external' select signal 393 is provided by application block 160, although not indicated in FIG. 1. In the alternative embodiment, reference voltage 388 may be provided as an additional output from DC-DC converter 300 to enable an external device/component (not shown) to perform the comparison performed otherwise by comparator 380.

After power-up (i.e., after DC-DC converter 300 is switched on), output power supply 395 may take a finite time-interval to reach (and be stabilized at) the desired output voltage level. Till such time output power supply 395 has a value less than the reference value provided on path 388, and the output of comparator 380 is logic low. As a result, multiplexer 390 provides supply 319 as power supply 394. When output power supply 395 has risen (and stabilized) to a value greater than or equal to the reference value on path 388 (i.e., once output power supply 395 has reached its steady-state value), output of comparator 380 is a logic high, multiplexer 390 provides output power supply 395 as power supply 394, and LDO 313 is switched OFF. The provision of output power supply 395 itself to power blocks (blocks that generate output power supply 395) in DC-DC converter 300 may be referred to by the term sub-regulation.

Path 394 may be viewed as the power supply terminal of the corresponding blocks/components noted above. Power supply 394 is provided as output 319 of LDO 313 when the regulated DC voltage on output node 395 is less than reference voltage 388, and as output power supply 395 otherwise.

It may be appreciated that the provision of output power supply 395 itself (rather than from LDO 313) for powering components/blocks in DC-DC converter 300 (once output power supply 395 reaches steady state) improves the efficiency of DC-DC converter 300. Specifically, current drawn from power supply 301 for operation of LDO 313 is eliminated once LDO 313 is switched off. Assuming again, for example, that the current drawn by LDO 313 is 50 micro Amperes (µA), reduction in power consumption achieved by switching-off LDO 313, and using output power supply 395 instead to power the corresponding blocks, equals 180 µW. Such reduction significantly improves the efficiency of DC-DC converter 300, especially at low load currents (current drawn from output power supply 395 is low (e.g., between 50 µA and 10 mA)). Further, the increased efficiency is obtained without resorting to the use of reliability-enhancing techniques noted above. Thus, components in blocks powered by power supply 394, being operated from relatively low values of power supply voltage (1.8V in the example embodiment of FIG. 3), do not require reliability enhancements. There may therefore be no additional costs or complexity associated with the approach of FIG. 3, such as for additional masks, etc.

The use of output power supply 395 for powering one or more of internal blocks of DC-DC converter 300 may cause variations (power supply ripple) in output 395. The manner in which such ripples are reduced in an embodiment is described next.

4. Minimizing Ripple

Figure 4:
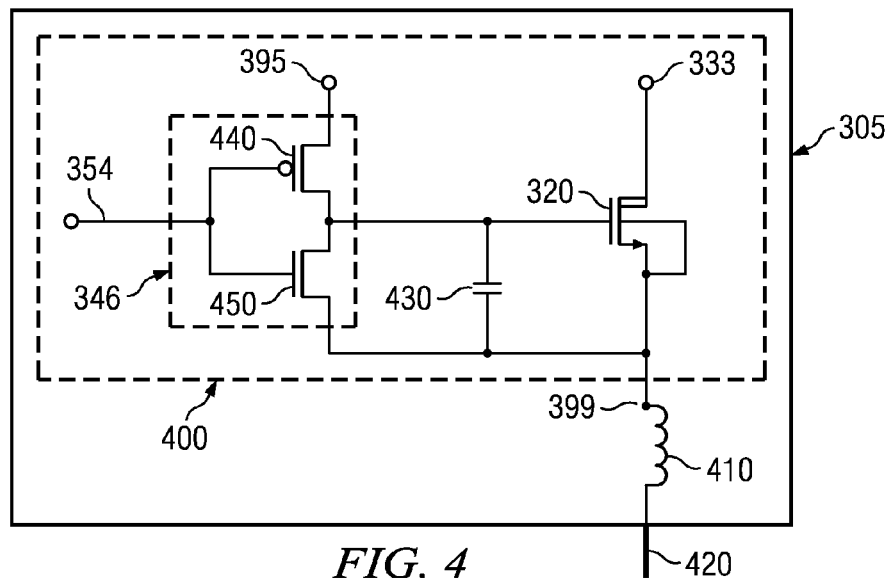
FIG. 4 is a diagram used to illustrate potential sources of ripple in the output of a DC-DC converter.
Figure 5:
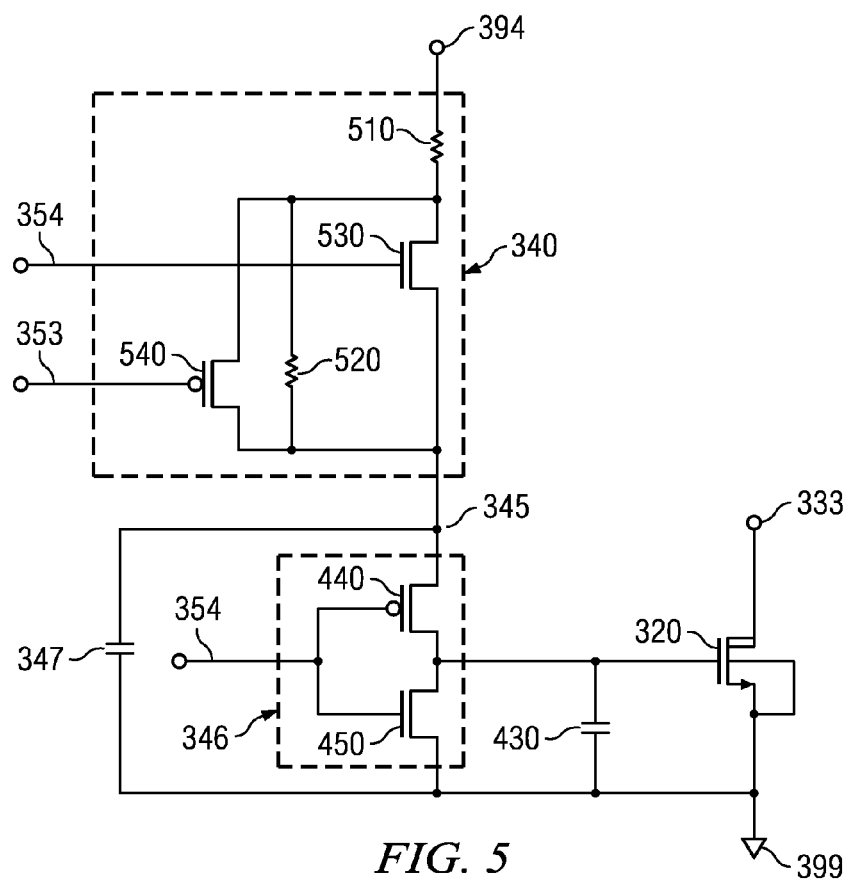
FIG. 5 is a circuit diagram illustrating the use of a resistance block and a capacitor in minimizing ripple in the output of a DC-DC converter, in an embodiment.

FIG. 4 is a diagram used to illustrate potential sources of ripple in a DC-DC converter, and shows the relevant components/portion of the circuit of FIG. 3. In FIGS. 4 and 5, output 394 of multiplexer 390 is assumed to be output power supply 395. Further, in FIG. 4, it is assumed that resistance block 340 is not connected, and output power supply 395 is instead shown connected directly to supply terminal 345 of N-DRV 346.

One potential source of ripple on output power supply 395 may be the parasitic capacitance between the gate and source terminals of transistor 320. The parasitic capacitance is represented in FIG. 4 as capacitor 430. In order to turn on transistor 320, capacitor 430 needs to be charged through N-DRV 346, shown implemented in FIG. 4 as a CMOS inverter using PMOS transistor 440 and NMOS transistor 450. N-DRV 346 is shown connected directly to supply 395 (provision of resistance block 340 being ignored to illustrate the nature of the problem), as it would be once output power supply 395 reaches steady state and is provided as the output of multiplexer 390.

When NMOS transistor 320 is to be switched ON, signal 354 goes to logic zero, switching OFF NMOS transistor 450 and switching ON PMOS transistor. Capacitor 430 charges using current drawn from output power supply 395 (via PMOS transistor 440). The current surge due to the charging of capacitor 430 may cause a reduction (ripple) in output power supply voltage 395, till capacitor 430 is fully charged. The duration and magnitude of the voltage ripple on output 395 may depend on factors such as capacitance of capacitor 430, magnitude of inductance 391, routing resistance of electrical paths connecting capacitor 430 to inductor 391, bond-wire/RDL (redistribution layer) parasitics, parasitics due to printed circuit board (PCB) traces when IC 305 is mounted on a PCB, etc. Thus, ripples in output power supply voltage 395 may be introduced every time NMOS transistor 320 switches ON. In an embodiment, resistance block 340 and capacitor 347 are provided to minimize the ripples, as illustrated with respect to FIG. 5, which is shown containing the relevant portions of the circuit of FIG. 3.

As shown in FIG. 5, resistance block 340 is implemented to contain NMOS transistor 530, PMOS transistor 540, and resistors 510 and 520. NMOS transistor 530 and PMOS transistor 540 are designed to operate in the linear region, and therefore as resistors. As shown in FIG. 5, control signals 353 and 354 used for controlling ON/OFF states of PMOS transistor 310 and NMOS transistor 320 respectively, are also used respectively for controlling ON/OFF states of PMOS transistor 540 and NMOS transistor 530. PMOS transistor 540 and NMOS transistor 530 are designed to provide low values of resistance (e.g., 10 to 20 ohms) when in the ON state. The charge stored and available in capacitor 347 supplies at least a significant portion of the current required for charging parasitic capacitance 430, thereby minimizing the current drawn from output power supply 395 for such charging. As a result, the ripple on output power supply voltage 395 is reduced. In an embodiment, resistor 510 has a value of the order of 25 ohms, and is used for providing a minimal series resistance in series with transistor 530 as well as transistor 540, to create a filter in combination with capacitor 347. Resistor 510 serves also to minimize coupling of signals on paths 353 and/or 354 to output power supply 395 due to respective parasitic capacitances between the gate and source terminals of transistor 540, and the gate and drain terminals of transistor 530.

Another potential source of ripple on output node 395 may be due to ground bounce effects, as described next.

Referring again to FIG. 4, block 400 represents the die boundary in which blocks of DC-DC converter 300 are implemented. Inductor 410 represents the inductance of a bond wire that connects ground (399) pad on die 400 to a ground pin 420 that may be provided as an external pin on the IC package (305). Although not shown, the bond wire may have an associated resistance as well.

When signals 353 and 354 respectively switch-OFF PMOS transistor 310 and NMOS transistor 320, PMOS transistor 540 and NMOS transistor 530 are also OFF. At instants when transistors 310 and 320 switch-OFF, the inductance of inductor 410 may still cause current to flow through inductor 410, since an inductance tries to oppose any change in current through it. As a result, the voltage at die ground 399 may be higher than the voltage at ground pin 420, an effect termed ground bounce. Thus, for example, at instances when transistors 310 and 320 switch-OFF ground 399 may exhibit a voltage spike of around 400 mV to 500 mV (with respect to the voltage at pin 420, assumed to be the ideal 0V ground reference). The voltage spike may couple to output power supply terminal 395 via capacitor 347, and cause ripple in output power supply voltage 395. Resistor 520, implemented to have a value of around 10 kilo ohms, minimizes the coupling of the spike from die ground 399 to output power supply 395. In addition, resistor 520 aids in the power-up of DC-DC converter 300 by providing a path (from node 394 to node 345) for power supply to N-DRV 346 (the states of signals 353 and 354 may not be stable at or just after power-ON).

Thus, resistance block 340 in combination with capacitor 347 minimizes ripple in the voltage at output power supply 395.

In the illustrations of FIGS. 1, 3, 4 and 5, although terminals/nodes are shown with direct connections to various other terminals, it should be appreciated that additional components (as suited for the specific environment) may also be present in the path, and accordingly the connections may be viewed as being electrically coupled to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, NMOS transistors and PMOS transistors may be swapped, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

In addition, the circuit topology of FIG. 3 is merely representative. Various modifications, as suited for the specific environment, without departing from the scope and spirit of several aspects of the embodiment(s) described above, will be apparent to one skilled in the relevant arts by reading the disclosure provided herein.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. An integrated circuit comprising:
    DC power connections having positive and negative nodes;
    an internal power path;
    a converted DC output node;
    DC-DC converter circuitry having an output connected to the converted DC output node, a first part of the DC-DC converter circuitry having DC power inputs connected between the positive and negative nodes of the DC power connections and a second part of the DC-DC converter circuitry having DC power inputs connected between the internal power path and the negative node;
    low drop out regulator circuitry having an input connected to the positive or negative node of the DC power connections and having an output coupled to the internal power path;
    comparator circuitry having a power input coupled to the positive node of the DC power connection, a first input connected to the converted DC output node, a second input connected to a reference voltage, and an output; and
    analog multiplexer circuitry having a first input connected to the output of the low drop out regulator circuitry, a second input connected to the converted DC output node, a control input connected to the output of the comparator circuitry, and an output connected to the internal power path.

2. The integrated circuit of claim 1 in which the first part of the DC-DC converter circuitry includes PMOS drive circuitry and a PMOS transistor.

3. The integrated circuit of claim 1 in which the second part of the DC-DC converter circuitry includes NMOS drive circuitry, logic circuitry, current limit comparator circuitry, and modulation comparator circuitry having power leads connected between the internal power path and the negative node.

* * * * *